Oct. 20, 1953  H. M. JONES  2,655,914
MEASURING DEVICE
Filed Feb. 13, 1950  3 Sheets-Sheet 2

Inventor:
Harry M. Jones,
By Schroeder, Merriam,
Hofgren & Brady, Attys.

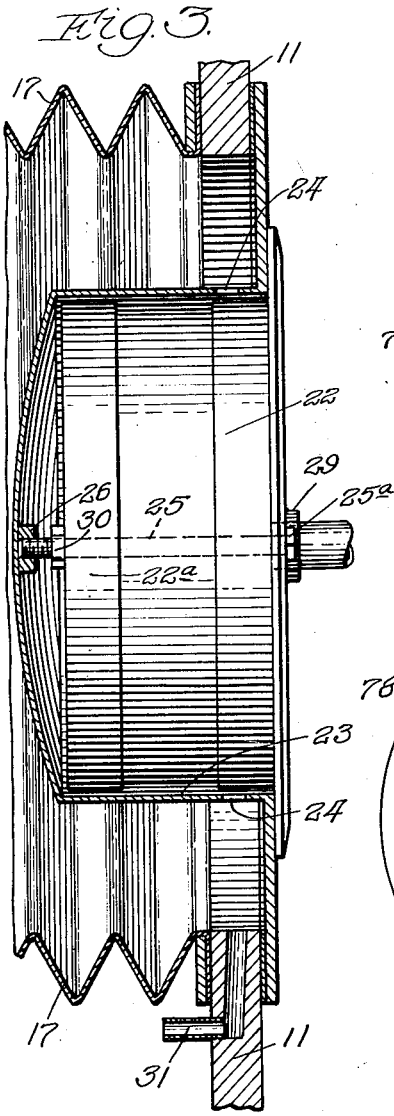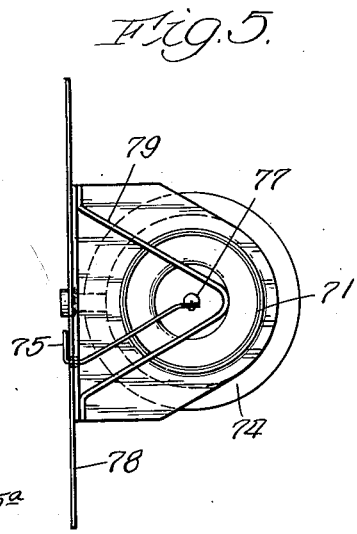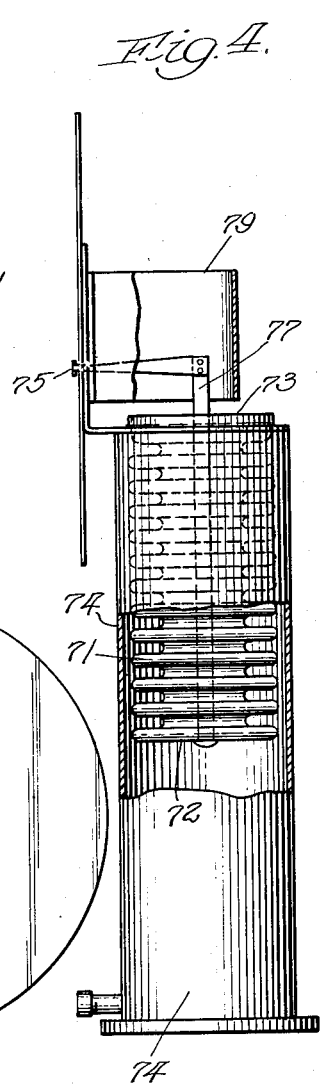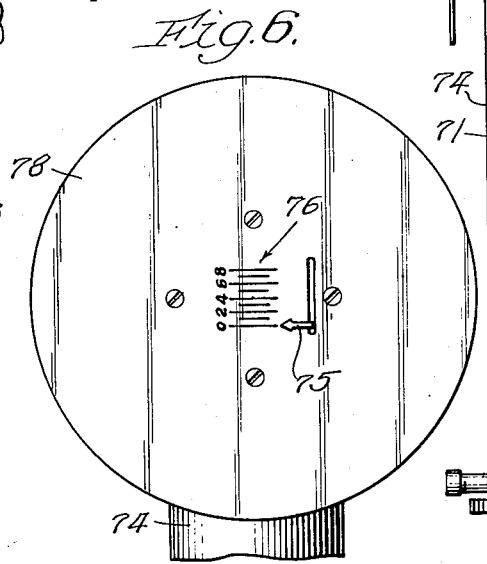

UNITED STATES PATENT OFFICE 2,655,914

MEASURING DEVICE

Horry M. Jones, Chicago, Ill.

Application February 13, 1950, Serial No. 143,907

8 Claims. (Cl. 128—2.07)

This invention relates to a measuring device, and more particularly to an apparatus for measuring the rate of consumption of oxygen by human beings.

By determining the rate at which a human being consumes oxygen, those skilled in the medical profession can determine the general health and pathological condition of the person's system. The rate of consumption is usually expressed in terms of minutes of time for consumption of a liter of oxygen, and this rate is usually referred to as the basal metabolism rate. The volume which a liter of oxygen occupies at any given time varies with the atmospheric conditions of barometric pressure, temperature and aqueous tension, according to well-known gas laws. It is important, therefore, in order to get an accurate measurement of the rate of consumption of oxygen that means be provided for correcting the volume of the oxygen breathed by the patient, to that volume the oxygen will occupy under the prevalent atmospheric conditions in which the rate was determined.

I have invented an apparatus which is easy and simple of operation and may be used to obtain an accurate measurement of the rate of consumption of oxygen by a human being. An embodiment of a preferred form of this invention is illustrated in the accompanying drawings, in which:

Fig. 3 is a vertical section through a soda-lime cartridge positioned in the back portion of the bellows;

Fig. 4 is a view of an instrument, partly in section, which indicates changes in atmospheric conditions;

Fig. 5 is an end view looking down on the instrument as illustrated in Fig. 4;

Fig. 6 is a plan view of the face on the instrument illustrated in Fig. 4; and

Fig. 7 is a plan view of a liter-expansion ruler used with the apparatus illustrated in Figs. 1 and 2.

The measuring apparatus of this invention comprises generally a housing containing an expansible bellows, a breathing tube connected with the interior of the bellows and a recording means on the front of the device for recording the movements of the bellows in response to the breathing of a patient therein.

Figure 1:
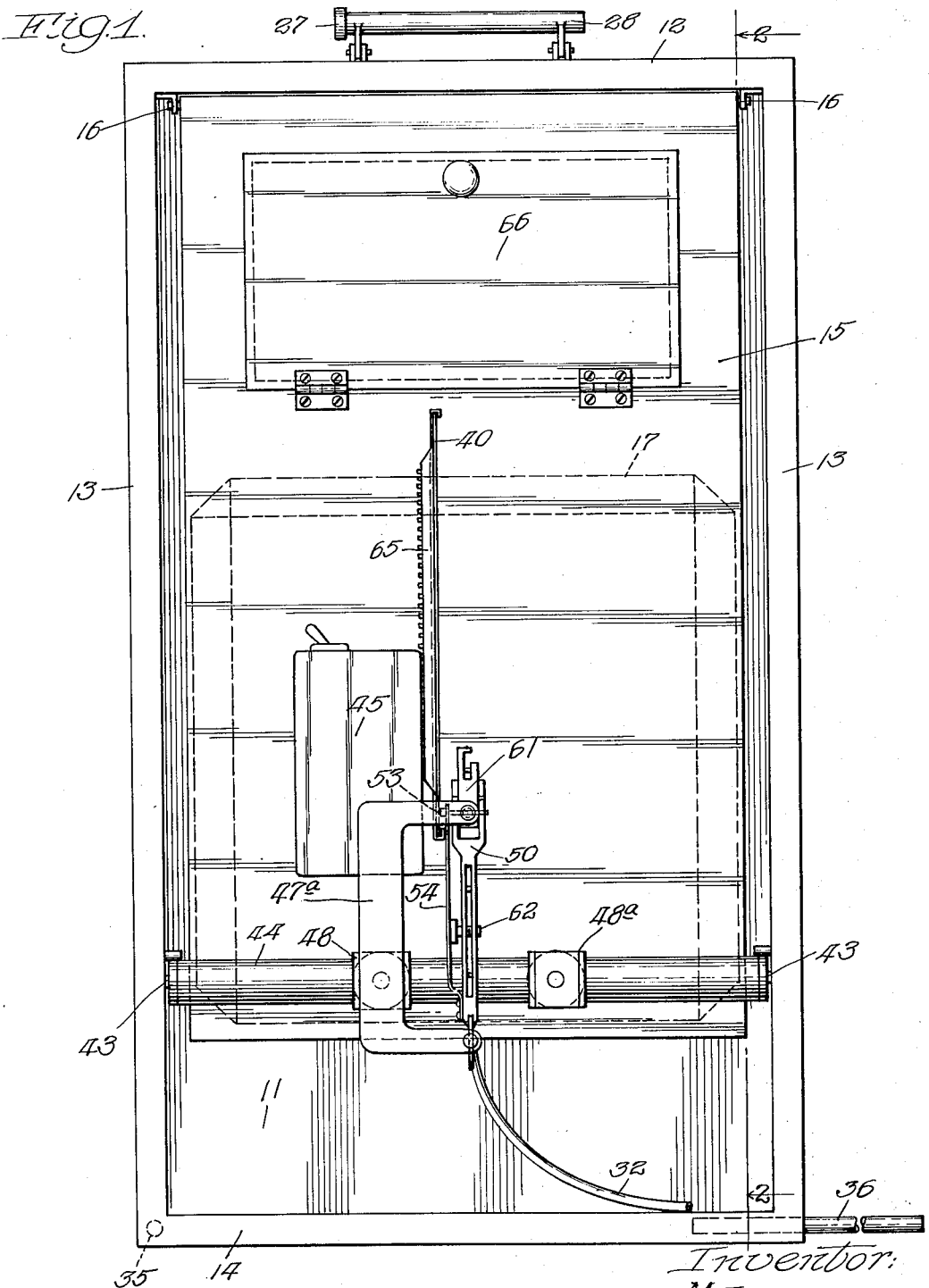
Fig. 1 is a front elevation of the measuring apparatus.

The housing 10 has a back wall 11 integral with the top 12, side walls 13 and bottom 14. The front of the housing is open and has mounted therein a front plate 15 hinged along its upper edge to the top 12 of the housing by hinges 16. In this manner the front plate 15 is freely hanging about the hinges 16 and may move back and forth within the housing. An expansible bellows 17 generally made of rubber, is mounted one end against the back 11 of the housing and the other end attached to the front plate 15. As seen in Fig. 1, the bellows 17 has a generally square transverse cross-section in the preferred form, but may have other transverse cross-sectional shapes. The connections of the bellows to both the back of the housing and the front plate 15 are airtight.

Figure 2:
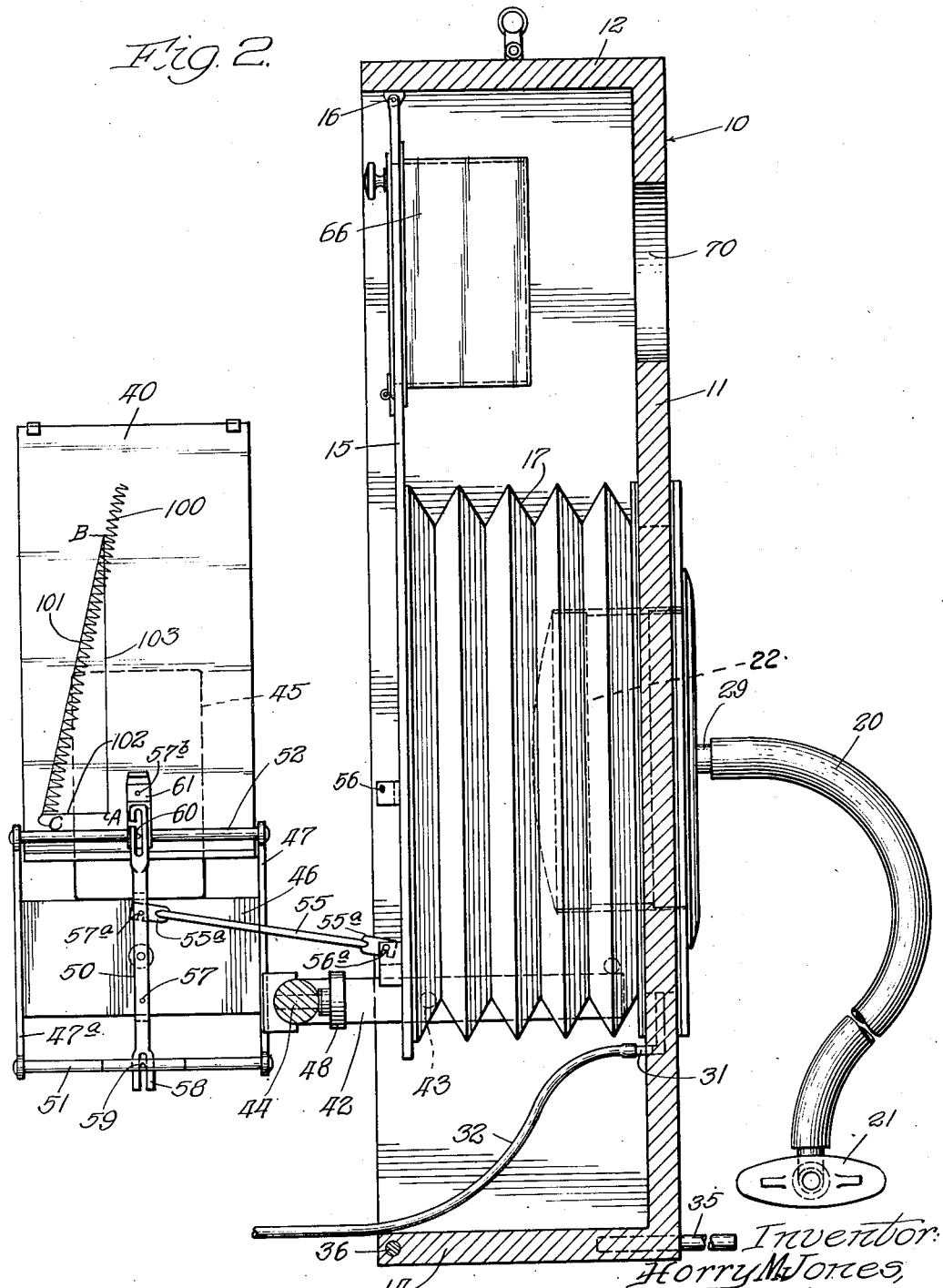
Fig. 2 is a vertical view partly in section, taken substantially along line 2—2 in Fig. 1.

As best seen in Figs. 2 and 3 a breathing tube 20 having a mouthpiece 21 at its outer end, is connected with the interior of the bellows through the rear of the housing. The breathing tube 20 communicates directly with the interior of a chemical cartridge 22 which is mounted in the back wall 11 of the housing in a pocket 23 extending inwardly into the interior of the bellows. The cartridge 22 may be filled with a chemical, such as soda-lime for the purpose of adsorbing carbon dioxide which is breathed outwardly by the patient. The air passage from the patient to the interior of the bellows is through the breathing tube 20 into the interior of the cartridge 22 out the back wall 22a of the cartridge and around the periphery of the pocket 23 and into the bellows through openings 24 near the back wall of the housing. The only air passage into the interior of the cartridge is through a perforated rear wall 22a so that all gases breathed by the patient must pass through the soda-lime in the cartridge. After a number of patients have been tested with the apparatus the soda-lime cartridge may have to be taken out and the chemical replaced as the adsorptive qualities of the soda-lime decrease with continued use. The cartridge is held in place within the pocket 23 by a screw 25 threaded into a nut 26 in the rear of the pocket. A socket wrench 27, conveniently carried in the top handle 28 on the housing, may be inserted in the nipple 29 on the back of the cartridge to engage the head 25a of the screw 25, and with a few turns the cartridge may be lifted out of the pocket 23. In order to replace the chemical within the cartridge a nut 30 is removed from the rear of the screw 25 and the perforated end plate 22a may then be easily removed from the cartridge.

When starting a test to determine the rate of consumption of oxygen a quantity of oxygen is placed in the bellows, which oxygen will then be breathed by the patient through the breathing tube 20. In order to get the oxygen into the bellows a nipple 31 is placed in the housing wall so that it communicates with the interior of the bellows and a tube 32 is connected with the nipple at one end and to a commercial oxygen bottle at the other end so that a quantity of oxygen may be placed within the bellows. A suitable valve on the oxygen bottle (not shown) is used to stop the flow of oxygen into the bellows when desired.

A patient for whom the basal metabolism rate is to be determined is generally given no food for a period from twelve to fifteen hours before the test is made so that the patient is at complete rest. Generally, the patient lies on a bed or the like and while in a reclining position, breathes through the breathing tube 20 into the bellows. In apparatus heretofore used a relatively long breathing tube was provided so that the apparatus stood on the floor beside the patient. Some inaccuracy was encountered in such apparatuses since a quantity of dead air in the breathing tube could not be dispensed with. In the present apparatus, the breathing tube 20 is relatively short, that is, having a capacity of thirty cubic centimeters or less. In this manner the amount of dead or residual air in the breathing tube 20 is minimized to an amount which does not seriously affect the results of the metabolism rate obtained. The position of a patient on a bed or the like is not changed to accommodate the short tube but the apparatus is set upon the edge of the bed next to the patient and legs 35 and 36 are removably placed in sleeves provided in the bottom 14 of the housing to extend outwardly from the housing approximately in the plane of the bottom thereof to steady the apparatus in its position on a bed or the like next to the patient. When not in use the legs 35 and 36 may be removed from the sleeves in the bottom of the housing and stored within the housing beside the expansible bellows.

As the patient breathes into the bellows consuming the oxygen placed therein, the bellows expands and contracts moving the front plate 15 back and forth about its hinged support 16 at the top of the housing. The movements of the bellows and the gradual decrease of the volume of oxygen within the bellows are recorded on a record sheet 40. In the embodiment illustrated a bracket 42 hinged on pins 43 mounted in the sides of the housing and having a front bar 44 supports a timing clock 45 and the record sheet 40. The clock 45 is supported on a block 46 mounted between a pair of U-shaped brackets 47 and 47a which are mounted on the front bar 44 by means of a thumb screw 48. The brackets 47 and 47a are each provided with means for attachment to the front bar 44 so that the recording device may be mounted to the left of center of the device as illustrated in Fig. 1 or may be turned around and mounted on the right hand side by use of thumb screw 48a. The results obtained, i. e., the graph of the movements of the bellows on the record sheet 40, will be the same whether the recording apparatus is mounted to the left of center of the device or to the right and this alternate mounting is provided so that the record sheet may be viewed easily by the attending physician whether the apparatus is placed on the left hand or right hand side of the patient.

A pen holder 50 is mounted on a pair of parallel and horizontal rods 51 and 52 which in turn are mounted on the brackets 47 and 47a. A pen 53 on a spring member 54 attached to the pen holder 50 scribes on the face of the record sheet 40 to record a visible graph of the movements of the bellows 17. An actuating rod 55 is connected at one end to the pen holder and at the other end to the front plate 15. The ends of the actuating rod 55 may be connected to both the pen holder and the front plate in a plurality of positions. The particular fastening device may be a plurality of fastening pins 56 and 56a on the front plate, and pins 57, 57a and 57b on the pen holder. The rod 55 is provided with a hook portion 55a at each end which hooks over the pins so that any movement of the front plate 15 is transmitted to the pen holder 50. The pen holder 50 is provided with a clevis 58 at its lower end contacting a pin 59 in the lower member 51 and rides along the length of the upper member 52 as the expansion of the bellows moves the pen holder. A pin and slot arrangement 60 at the upper end of the pen holder allows the pen holder 50 to pivot as the travelling member 61 moves along the upper member 52 and at the same time the clevis 58 will move in a generally up and down direction over the pin 59. A tension screw 62 is provided in the body of the pen holder 50 bearing against the spring member 54 to apply the correct tension to the pen 53 as it rides against the record sheet 40. The timing clock 45 is provided with means for lowering a record plate 65 which holds the record sheet 40 so that the graph of the movements of the bellows is started at the lower portion of the record sheet and travels upwardly thereover.

The apparatus in general is made compactly so that all the accessories and apparatus may be stored within the housing 10 when not in use. A hinged drawer 66 is provided in the upper portion of the front plate for containing the smaller accessories and the timing clock and record sheet may be stored in the bottom portion of the housing under the bellows.

Since a given volume of gas, for an example a liter of oxygen, will occupy a different volume under different atmospheric conditions of barometric pressure, temperature and aqueous tension, it has been a practice in the past to correct the results of a basal metabolism test by a mathematical computation having its basis in the particular reading of the atmospheric conditions under which the tests were made. In the present invention the metabolism rate may be obtained directly without the necessity of a mathematical computation to correct the results for the particular atmospheric conditions under which the tests were made. An instrument responsive to changes in barometric pressure, temperature and aqueous tension is mounted in the housing 10 above the bellows 17 so that the face of the instrument is viewable from the rear of the housing through an opeing 70 therein. The instrument is illustrated in Figs. 4, 5 and 6 removed from the housing. A Sylphon bellows 71 having a closed end 72 and an open end 73, is enclosed in an airtight container 74 and attached to the container only at its open end 73. The atmosphere between the container and the bellows is saturated while the interior of the bellows is exposed to the outside atmosphere through the open end 73. A rod 71 is fixed to the closed end 72 of the Sylphon bellows and extends out the open end 73 to support a pointer 75 opposite a scale 76 on the instrument face 78 mounted on the container 74. A guard 79 is placed about the outer end of the rod and the pointer 75 to protect them from damage. The instrument is responsive to barometric pressure and temperature by expansion and contraction of the bellows and is also responsive to changes in aqueous tension since the space between the bellows and the container is a saturated atmosphere. The scale 76 does not give a direct reading of the above mentioned atmospheric conditions, but merely indicates changes in those conditions for a purpose hereinafter more fully explained.

A liter of oxygen (under standard conditions) injected into the bellows 17, when the bellows is contracted to its inward limit will cause the bellows to expand a given distance under a given set of atmospheric conditions. However, this liter of oxygen under different atmospheric conditions than above, will cause the bellows to expand a greater or lesser distance. In the apparatus of this invention the bellows is carefully calibrated in its expansion by use in combination with the instrument illustrated in Figs. 4, 5 and 6 and a liter-expansion ruler 80, shown in Fig. 7. For example, when the pointer 75 is opposite the scale marked "zero" as illustrated in Fig. 6, a liter of oxygen is injected into the bellows 17 and the distance which the bellows expands, as determined by movement of the pen 53 on the record sheet 40 when the actuating rod is connected as illustrated in Fig. 2, is recorded on the liter expansion ruler 80 from the base line 81 to the line marked "zero" thereon. The ruler 80 is calibrated by observation under different atmospheric conditions following the steps outlined above. The calibration of the ruler 80 is carried on in this manner until an accurate measurement of the expansion of the bellows upon injection of a liter of oxygen therein is obtained under different atmospheric conditions as indicated by the scale on the instrument shown in Fig. 6. Each mark on the ruler indicates the expansion of one liter of oxygen in the bellows under a different atmospheric condition which will bring pointer 75 to the corresponding mark on scale 76. After the ruler 80 has been so calibrated the apparatus may then be used to obtain the rate of consumption of oxygen of a patient under any atmospheric conditions and the expansion of a liter of oxygen placed in the bellows may be measured on the liter expansion ruler 80 to a calibration corresponding to the calibration on the face 78 opposite the pointer 75.

For an example of the operation of this apparatus, suppose that a patient breathing into the bellows 17 has recorded a graph 100 which is illustrated on the record sheet 40 in Fig. 2. A slope line 101 is drawn along the mean of the left hand portion of the points of the graph made by the pen 53. Suppose the pointer 75 operating under influence of the prevalent atmospheric conditions is opposite the mark "zero" on the scale 76 of the instrument responsive to said atmospheric conditions. Under these conditions one liter of oxygen would expand the bellows 17 a distance from the base line 81 on the liter expansion ruler 80 to the line marked "zero" thereon and this distance is laid off along the line 102 on the record sheet 40, between points "C" on the slope line 101 and point "A." Then a line 103 is marked from the point "A" vertically on the sheet to intersect the slope line at point "B." Since the clock 45 has travelled the record sheet downwardly at a known rate, the distance between points "A" and "B" represents the time elapsed during which the patient has consumed one liter of oxygen and this record gives the basal metabolism rate in terms of minutes per liter.

As stated above, the actuating rod 55 may be attached to the front plate and the pen holder in a plurality of positions. As the position of attachment is varied a given movement of the bellows will record a greater or lesser movement of the pen 53 on the sheet. When a patient having a small lung capacity is being tested, the lower connections will be used so that a larger amplitude of movement of the pen will be recorded on the record sheet and conversely, a patient with a larger lung capacity may be tested with the actuating rod 55 connected between the front plate and pen holder in the upper position to minimize the amplitude of the recorded movements of the bellows. Means are provided on the record sheet 40 for interpolating to obtain correct results from the measurement on the liter expansion ruler 80, calibrated to the apparatus when the actuating rod is connected between the front plate and pen holder as shown in Fig. 2 although the rod 55 may be connected at other points.

The foregoing detailed description has been given for clearness of understanding only and no unnecessary limitations should be understood therefrom, but the invention should be considered broadly within the spirit and scope of the appended claims.

I claim:

1. An apparatus for measuring the rate of consumption of oxygen comprising a housing, a front plate pivotally mounted along its upper edge to the top of the housing, and expansible bellows mounted between the rear of the housing and said front plate, said housing having a pocket in its rear wall extending into the interior of the bellows, a cartridge adapted to contain a chemical and removably positioned in said pocket, and a breathing tube connected with the interior of said cartridge whereby gases breathed by a patient pass through said cartridge.

2. The apparatus of claim 1 wherein said cartridge is removably held in said pocket by a screw extending through the center thereof and threaded into the back of said pocket.

3. An apparatus for measuring the rate of consumption of oxygen comprising, a housing having an open front, a front plate hinged along its upper edge to the top of the housing, an expansible bellows having one end secured to the back of the housing and the other end secured to said front plate, a bracket pivoted on said housing and movable from a position within the housing to a horizontal position in front of said plate, a timing mechanism and record sheet mounted on said bracket, a pen shaft mounted adjacent the record sheet and an actuating rod attached to the front plate and said pen shaft for moving the shaft upon movement of said bellows.

4. Apparatus as claimed in claim 3 wherein said actuating rod may be attached to both the front plate and the pen shaft in a plurality of positions.

5. An apparatus for measuring the rate of consumption of oxygen comprising a housing, a front plate hinged along its upper edge to the top of the housing, an expansible bellows having one end secured to the back of the housing and the other end secured to said front plate, a bracket supported by the housing in front of said front plate for mounting a timing mechanism and record sheet, a pen shaft having two points of support adjacent a record sheet, one of said points being movable in the general direction of movement of said bellows and the other of said points being fixed in said direction, and an actuating rod attached to said front plate and pen shaft for moving the shaft upon movement of said bellows.

6. Apparatus as claimed in claim 5 wherein said actuating rod may be attached to both the front plate and the pen shaft in one of a plurality of positions.

7. Apparatus as claimed in claim 5 wherein said pen shaft is carried on a pair of vertically spaced horizontal bars with the pen shaft slidingly mounted on the upper bar and having a clevis contacting a pin on the lower bar.

8. An apparatus for measuring the rate of consumption of oxygen comprising, a housing having a front plate hinged along its upper edge to the top of the housing, an expansible bellows mounted in the housing between said front plate and the rear of the housing, a breathing tube communicating with the interior of the bellows through the rear of the housing, said tube being short and having a volume of not more than 30 cubic centimeters, and a pair of removable legs extending outwardly from the housing and approximately in the plane of the bottom of the housing for steadying the apparatus when placed on a bed or the like adjacent a patient.

HORRY M. JONES.

References Cited in the file of this patent

UNITED STATES PATENTS

| Number | Name | Date |
| --- | --- | --- |
| 1,358,071 | Fulton | Nov. 9, 1920 |
| 1,863,929 | McKesson | June 21, 1932 |
| 2,180,057 | Jones | Nov. 14, 1939 |
| 2,221,482 | Jones | Nov. 12, 1940 |
| 2,228,983 | Bloomheart | Jan. 14, 1941 |

FOREIGN PATENTS

| Number | Country | Date |
| --- | --- | --- |
| 807,293 | France | Oct. 12, 1936 |